E. J. FROST.
ADJUSTABLE BEARING.
APPLICATION FILED MAR. 21, 1911.

994,452.

Patented June 6, 1911.

2 SHEETS—SHEET 1.

Witnesses
O. B. Baenziger.
Elizabeth M. Brown

Inventor
Edward J. Frost.
By Edward N. Pagelsen.
Attorney

E. J. FROST.
ADJUSTABLE BEARING.
APPLICATION FILED MAR. 21, 1911.
994,452.
Patented June 6, 1911.
2 SHEETS—SHEET 2.
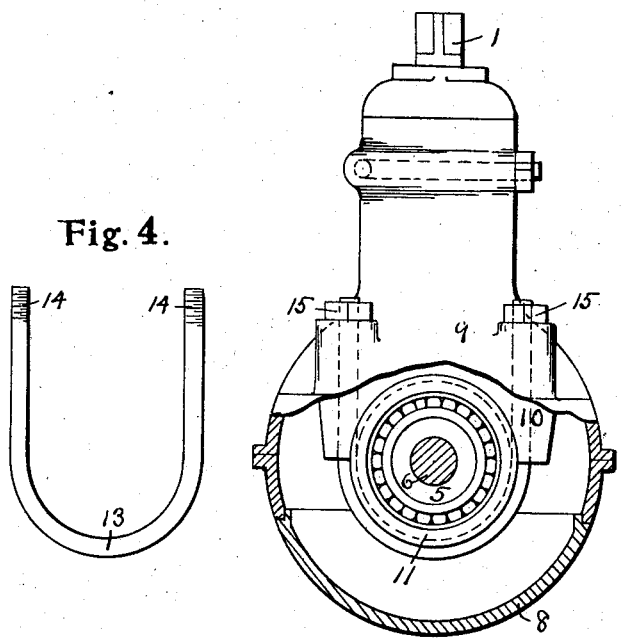
Fig. 4.
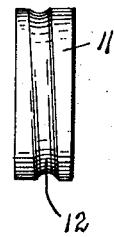
Fig. 5.
Fig. 3.
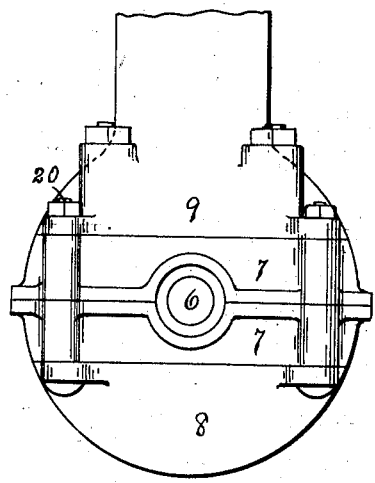
Fig. 6.
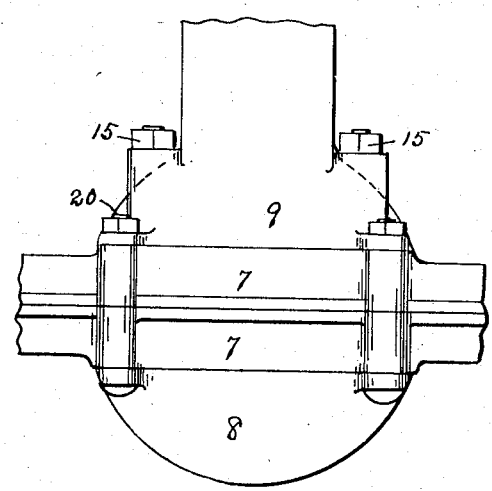
Fig. 7.
Witnesses
O. B. Baenziger
Elizabeth M. Brown
Inventor
Edward J. Frost
By Edward N. Pagelsen
Attorney

UNITED STATES PATENT OFFICE.

EDWARD J. FROST, OF JACKSON, MICHIGAN.

ADJUSTABLE BEARING.

994,452.　　　　Specification of Letters Patent.　　Patented June 6, 1911.

Application filed March 21, 1911. Serial No. 615,967.

*To all whom it may concern:*

Be it known that I, EDWARD J. FROST, a citizen of the United States, and a resident of Jackson, in the county of Jackson and State of Michigan, have invented a new and useful Adjustable Bearing, of which the following is a specification.

This invention relates to adjustable bearings for shafts and other revolving cylinders, and its object is to provide a securing and adjusting device particularly adapted for the bearings of the differential driving gearing of the rear axles of automobiles.

This invention comprises a stationary portion or frame having a semi-cylindrical seat; a ring mounted therein and provided with a helical groove; a yoke for holding said ring in position; and a bearing carried by said ring.

Figure 1:
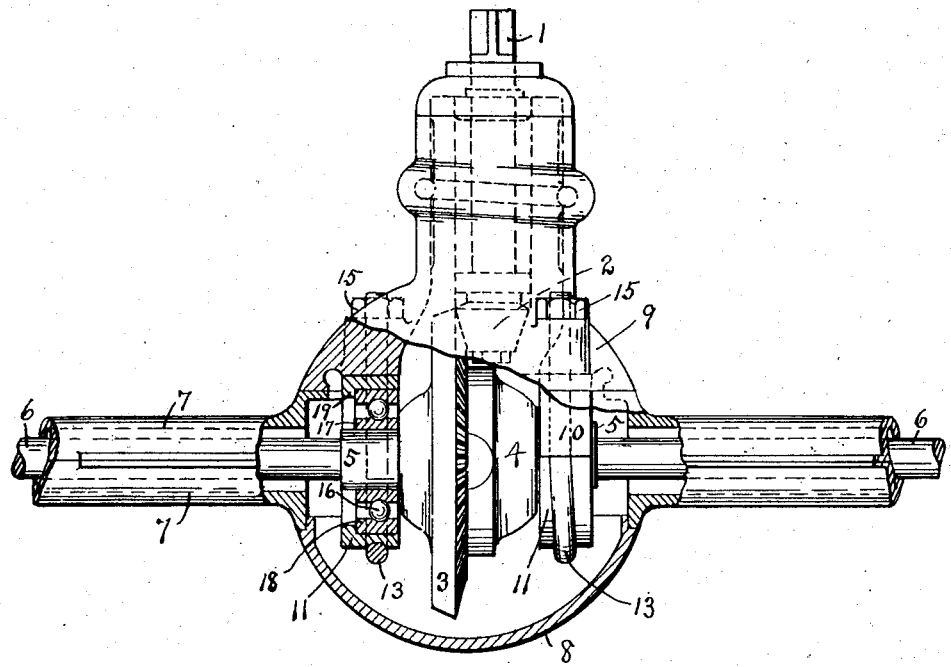
Figure 2:
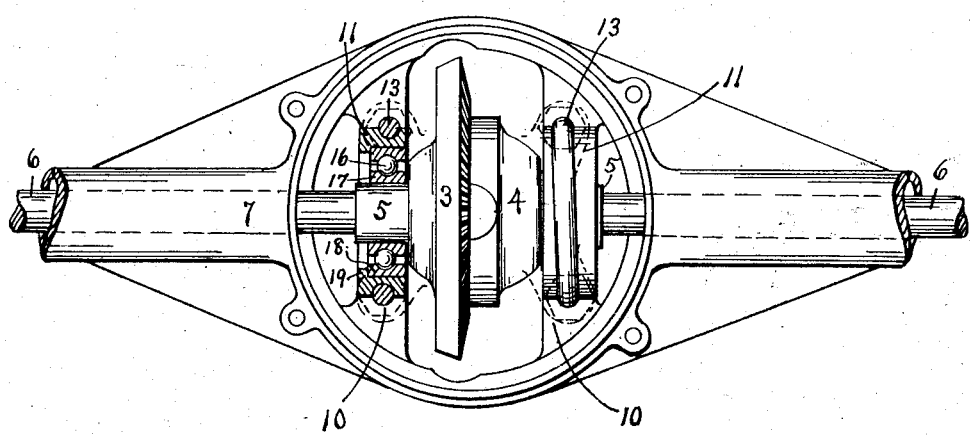

In the accompanying drawing Figure 1 is a plan of a differential driving mechanism of a rear axle of an automobile, with portions of the shell broken away to show this improved adjustable bearing. Fig. 2 is a rear elevation of the same with the cap of the inclosing-shell removed. Fig. 3 is an end view of a construction of this type with the driving shaft vertical, and a portion of the shell broken away. Fig. 4 is a view of a securing yoke. Fig. 5 is an elevation of an adjustable ring. Fig. 6 is an end view and Fig. 7 is a side view of the shell shown in Fig. 3.

While the adjustable bearing shown in the drawings may be employed in connection with any rotating shaft, it is especially designed for the differential gear-mechanisms of rear axles. The drawings show two constructions, that of Figs. 1 and 2 being especially designed for the usual rear axles of automobiles, while that shown in Figs. 3, 6 and 7 being designed for other constructions. These designs are very similar to each other and the same reference characters will be employed through the several views.

The driving shaft 1 is shown provided with a bevel pinion 2 which engages the bevel gear 3. This gear forms a portion of the differential-gear mechanism 4, which is provided with bearing-sleeves 5. In these sleeves are revoluble the shafts 6 which form the rear axle of the vehicle. These shafts may be inclosed in either half or tubular casings 7 of any desired construction, that shown in the drawings being merely an example of construction.

A cap 8 may close the opening on one side of this casing while a head 9 may close the opening on the other side. This head 9 forms the supporting frame for the bearings. Projecting inwardly from this head 9 are saddles 10 which are provided with semi-cylindrical bores adapted to receive the rings 11. As shown in Fig. 5 these rings are formed with helical grooves 12, in which grooves the yokes 13, formed by bending a bolt with threaded ends 14, engage. Nuts 15 on the ends of the yokes are adapted to be screwed down so that the yokes 12 will rigidly hold the rings 11 in position. It will readily be seen that by loosing these nuts 15 and turning the rings 11, the rings will move endwise. Any desired type of bearing may be employed in this construction. Those illustrated are ball-bearings, each consisting of the inner ring 17, the balls 16 and the outer ring 18, which latter is prevented from moving endwise by an annular shoulder 19 on a ring 11. These ball-bearings will usually be in pairs and have the usual tendency of bearings of this type, which is to enlarge the grooves in the rings 16 and 18 through wear. By turning the ring 11 in its yoke the ring 19 will be moved inwardly, thus reducing the effective size of the grooves in which the balls run. The casing and shell may be secured together in any desired manner, the bolts 20 being shown as a desirable construction.

The helical pitch of the grooves 12, the sizes of the different parts, the construction of the support or frame which carries the saddles 10, and the proportions of the individual pieces may all be varied to meet the various conditions under which such bearing may be employed without departing from the spirit of my invention.

Having now explained my construction, what I claim as my invention and desire to secure by Letters Patent is:—

1. The combination with a rigid frame, a plurality of projections formed thereon having alined semi-cylindrical bores, rings mounted in said bores and provided with helical grooves, U shaped yokes extending around said rings in said grooves and having their ends projecting through holes in said frame, nuts on the ends of said yokes, and bearings mounted in said rings.

2. The combination with a rigid frame, a plurality of projections formed thereon having alined semi-cylindrical bores, rings mounted in said bores and provided with helical grooves, U shaped yokes extending around said rings in said grooves and having their ends projecting through holes in said frame, nuts on the ends of said yokes, and bearings mounted in said rings, said rings having internal flanges at their outer ends to prevent outward movement of said bearings.

3. The combination of a rigid frame comprising a projection having a semi-cylindrical socket, a bearing ring in said socket and provided with a helical groove, a yoke fitting said groove, and means to secure the yoke in position in said frame.

In testimony whereof I have signed this specification in the presence of two subscribing witnesses.

EDWARD J. FROST.

Witnesses:
E. J. McKAIN,
A. E. DIBBLE.